March 14, 1950      H. E. PETERSEN      2,500,321
AUTOMATIC HYDRAULIC BRAKE FOR BAND SAWS
Filed May 20, 1946
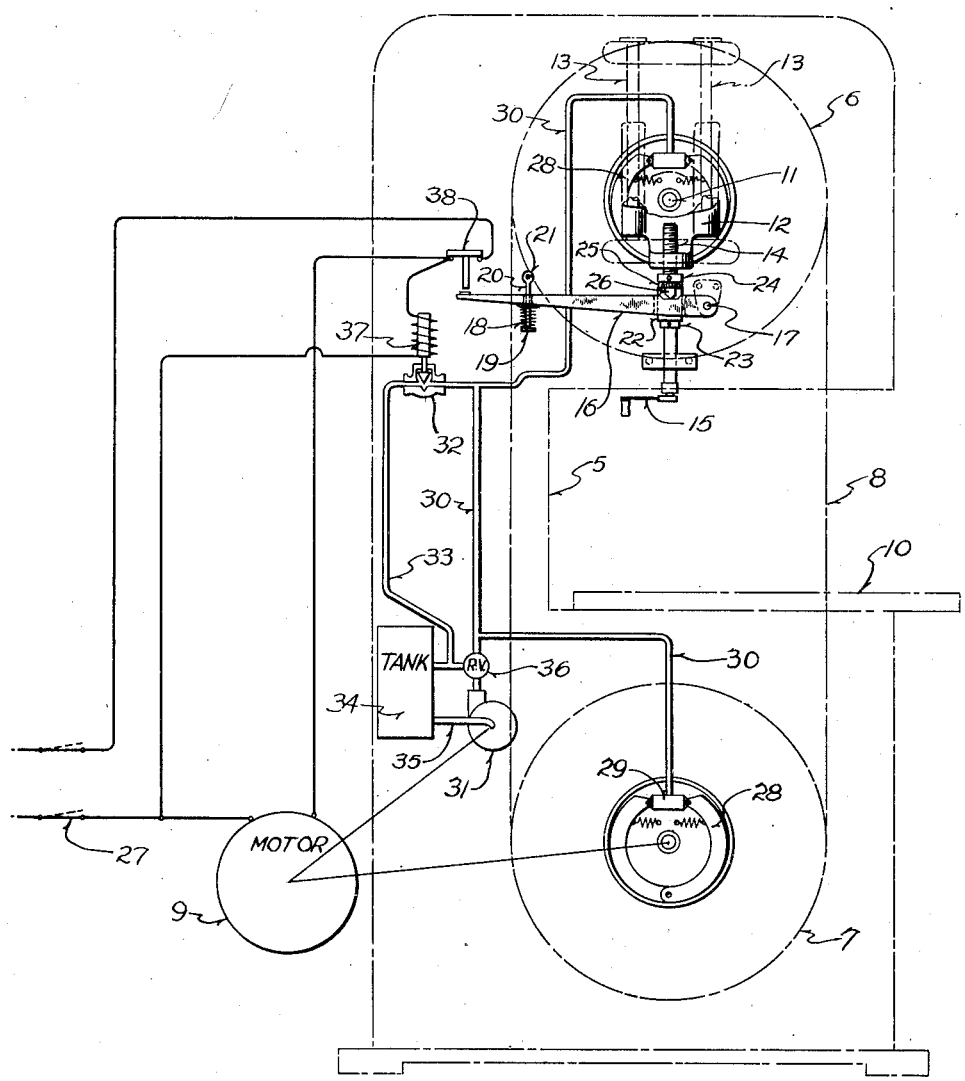
Inventor
Hans E. Petersen Patented Mar. 14, 1950

2,500,321

UNITED STATES PATENT OFFICE 2,500,321

AUTOMATIC HYDRAULIC BRAKE FOR BAND SAWS

Hans E. Petersen, Minneapolis, Minn., assignor to Continental Machines, Inc., Minneapolis, Minn., a corporation of Minnesota Application May 20, 1946, Serial No. 671,011

3 Claims. (Cl. 143—17)

This invention relates to machine tools and refers particularly to an automatic hydraulic brake for band saws.

The desirability of instantly stopping relative motion between the tool and work support of any machine tool upon stopping of the drive motor or breakage of the tool can be readily appreciated. It is especially desirable in the case of a band saw. In the event of an accident involving operation of the machine, a quick stop minimizes the chances of serious injury. This is especially true of band saws where a broken saw band thrashes about wildly unless the pulleys are quickly stopped.

It is, therefore, an object of this invention to provide a brake for machine tools which will be applied automatically whenever the drive motor for the machine is stopped and whenever breakage of the tool occurs.

More specifically, it is an object of this invention to provide an automatically operable hydraulic brake especially adapted for use on band saws, wherein the application of the brake follows closure of a by-pass for the fluid under pressure supplied to the actuating element of the brake and wherein means are provided for closing the by-pass upon opening of the motor switch and/or by a spring held in a potentially active or loaded condition by the tension on the saw band as long as the band does not break.

With the above and other objects in view which will appear as the description proceeds, this invention resides in the novel combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed in accordance with the best mode so far devised for the practical application of the principles thereof, and in which the single figure is a side elevational view of a conventional band saw diagrammatically illustrating the application of this invention thereto.

Referring now to the drawing, the numeral 5 designates the frame of an ordinary band saw which, as is customary, has upper and lower pulleys 6 and 7 about which a saw band 8 is trained. The lower pulley 7 is driven by an electric motor 9 operating through suitable power transmission means (not shown) to impart movement of the exposed stretch of the saw band downwardly through the working zone defined by the space above a support 10.

The upper pulley 6 is adapted to be moved toward and from the lower pulley to enable tensioning the saw band. To this end the axle 11 of the upper pulley is supported in bearings carried by a cross-head 12 guided for up and down motion on suitably supported stationary guides 13.

An adjusting screw 14 having a crank 15 is provided for raising and lowering the cross-head to tension the saw band. The adjusting screw 14 passes freely through the medial portion of a lever 16 pivoted at one end to a fixed fulcrum 17, the lever having a hole therethrough to accommodate the screw 14. The outer free end of the lever is yieldingly urged upwardly by a spring 18 confined between the underside of the lever and a collar 19. The collar 19 is carried on the lower end of a tension rod 20, the upper end of which is suspended from the frame as at 21. The tension rod 20 passes freely through a hole in the outer end of the lever 16.

The hole in the medial portion of the lever 16 through which the tension screw 14 passes, receives a bushing 22 mounted on the tension screw. This bushing is rotatably free with respect to the screw so as to permit the screw to turn therein, but is held against axial displacement thereon by collars 23 and 24. A thrust bearing 25 is interposed between the top of the bushing 22 and the upper collar 24.

Arms 26 provided with knife edges on their undersides extend laterally from the bushing 22 to engage and rest on the adjacent side portions of the lever 16. Thus the tensioning force by which the saw band is kept taut is carried through the lever 16, and opposes the spring 18. In other words as the tension on the saw band is increased, so likewise the spring 18 is placed under greater compression. The spring 18, therefore, yieldingly biases the lever 16 for clock-wise movement about its fixed fulcrum 17, but this biasing force is opposed by the saw band and as a consequence the lever 16 remains stationary as long as the saw band does not break.

Upon breakage of the saw band, the energy of the spring 18 is suddenly released and the free end of the lever 16 is snapped upwardly. This response of the lever 16 to breakage of the saw band, as well as opening of the switch 27 which controls the drive motor 9, is utilized to effect the application of two hydraulic brakes 28, one acting upon the upper pulley and the other upon the lower pulley. These hydraulic brakes may be of any suitable design and construction, and as is customary, include a cylinder 29 or other suitable fluid responsive actuating element for applying the brake.

Fluid pressure is applied to the actuating elements 29 through pressure lines 30 leading from the outlet of a pump 31 whenever a control valve 32 closes a by-pass line 33. The line 33 leads from the pressure line back to the fluid source 34 which, of course, is connected with the inlet of the pump by a feed line 35.

A relief valve 36 connected between the outlet of the pump and the tank which constitutes the fluid supply 34 guards against the application of excessive pressure to the line 30 and the brake actuators 29.

The valve 32 is electro-magnetically controlled or responsive, being held open by a solenoid 37 whenever the same is energized and closing whenever this solenoid is deenergized. Energization of the solenoid 37 is effected concomitantly with the closure of the motor starting switch 27 so that whenever the machine is started, the control valve 32 is automatically opened. The opening of the valve 32, however, does not in anywise affect the condition of the brakes, for inasmuch as the pressure pump 31 is driven from the motor 9, there is no pressure available for brake application when the machine is idle.

As the machine starts, the pump 31 begins to pump fluid into the pressure line 30. As long as the control valve 32 remains open, the fluid courses freely through the by-pass line 33. However, the instant the motor control switch 27 is opened and the solenoid 37 deenergized, closure of the valve 32 and consequent application of the hydraulic brakes takes place.

Deenergization of the solenoid 37 independently of the starter switch 27 is also effected automatically upon the breakage of the saw band by the opening of a switch 38 connected in series circuit with the solenoid 37. The switch 38 is normally closed and is opened by the response of the lever 16 to the released pressure of the spring 18 upon breakage of the saw band. Opening of the switch 38 also opens the motor circuit and thus simultaneously effects application of the brakes and stopping of the motor.

It will, of course, be understood that while opening of either switch 27 or 38 disconnects the motor from the line, there is sufficient inertia in the motor driven movable parts to keep the pressure pump 31 operative long enough to apply the hydraulic brakes. This has the advantage of automatically releasing the brakes when the machine comes to rest.

From the foregoing description taken in connection with the accompanying drawing, it will be readily apparent to those skilled in this art that this invention fills a definite need in machine tools and particularly band saws, and that by automatically and quickly arresting movement of the driven parts of the machine tool, serious injury due to accidental breakage of the tool and other possible accidents often will be precluded.

What I claim as my invention is:

1. In a band saw having a saw band trained about spaced apart pulleys; an electric motor connected with one of said pulleys to drive the same; a hydraulic brake for one of said pulleys, said brake having a fluid pressure responsive actuating element; a fluid pressure pump driven by said motor and having its inlet connected with a source of fluid; a pressure line connecting the outlet of the pump with the actuating element of the hydraulic brake; a by-pass connecting said pressure line with the fluid source and through which the fluid discharging from the pump freely courses to preclude the application of fluid pressure to the actuating element of the brake as long as the by-pass is open; a valve for closing said by-pass to consequently effect application of the brake; and means operable in response to breakage of the saw band for effecting closure of said valve.

2. In a band saw having a saw band trained about spaced apart pulleys; an electric motor drivingly connected with one of said pulleys; means for maintaining the saw band under tension including a spring loaded part movable in a predetermined direction under the influence of a spring upon breakage of the saw band; a hydraulic brake for one of said pulleys, said brake having a fluid pressure responsive actuating element; a fluid pressure pump driven by said electric motor and having its inlet connected with a source of fluid; a pressure line connecting the outlet of the pump with the actuating element of the brake; a by-pass connecting between said pressure line and the fluid source, and through which the fluid discharging from the pump freely courses to preclude the application of fluid pressure to said actuating element as long as the by-pass is open; a solenoid operated valve in said by-pass biased to a position closing the same, said valve being adapted to open in response to energization of its solenoid; energizing circuits for the electric motor and the solenoid of said valve; and a normally closed switch common to said energizing circuits and actuated to open position by motion of the spring loaded part in said predetermined direction upon breakage of the saw band for disrupting said energizing circuits to consequently effect application of the hydraulic brake by the resulting closure of the solenoid operated valve in the by-pass.

3. The band saw set forth in claim 2 further characterized by the provision of a manually operable master switch in series with said normally closed switch so that opening of either switch disrupts said energizing circuits to cause application of the hydraulic brake and stopping of the electric motor.

HANS E. PETERSEN.

REFERENCES CITED

The following references are of record in the file of this patent:

UNITED STATES PATENTS

| Number | Name | Date |
|---|---|---|
| 579,382 | Coleman | Mar. 23, 1897 |
| 1,757,785 | Sullenberger | May 6, 1930 |
| 1,927,203 | De Groot | Sept. 19, 1933 |
| 2,311,268 | Tannewitz | Feb. 16, 1943 |
| 2,372,393 | Ray | Mar. 27, 1945 |